Sept. 10, 1929.   J. H. BIGGAR   1,727,955
ELECTRICAL CABLE
Filed Oct. 22, 1924   2 Sheets-Sheet 1
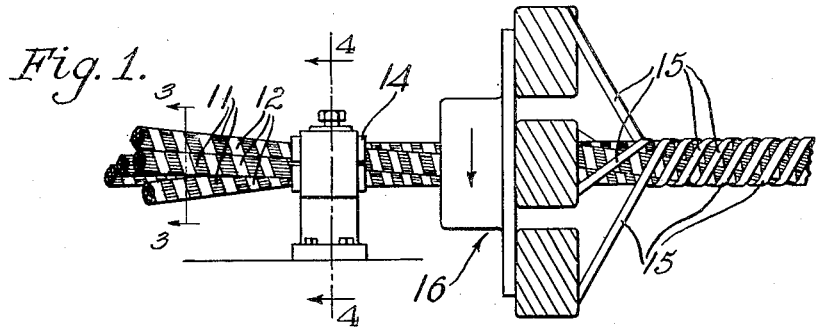
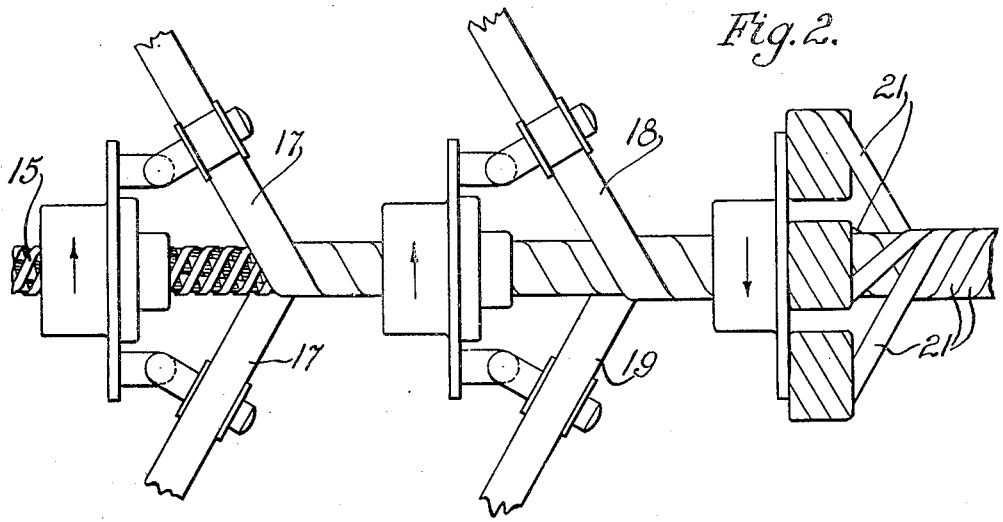
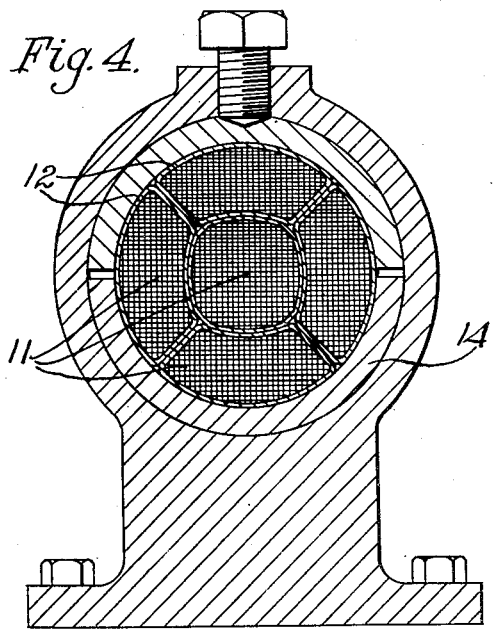
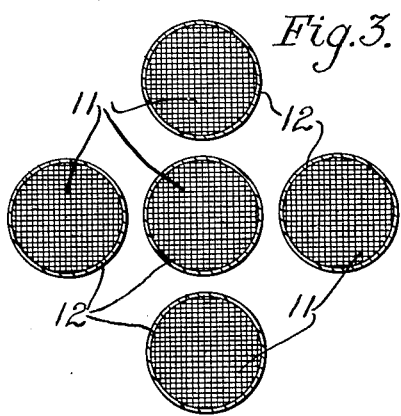
Inventor
John H. Biggar
by *H. A. Patterson*
Att'y.

Sept. 10, 1929.  J. H. BIGGAR  1,727,955
ELECTRICAL CABLE
Filed Oct. 22, 1924   2 Sheets-Sheet 2
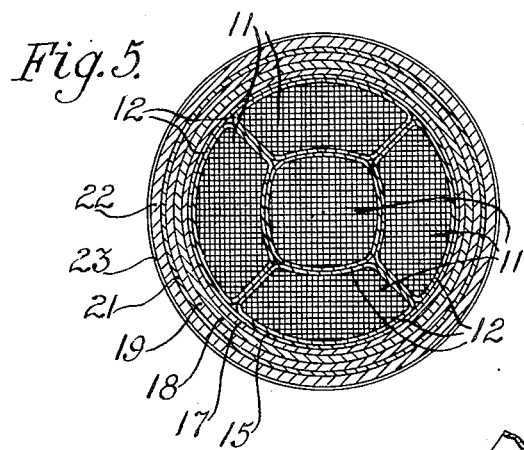
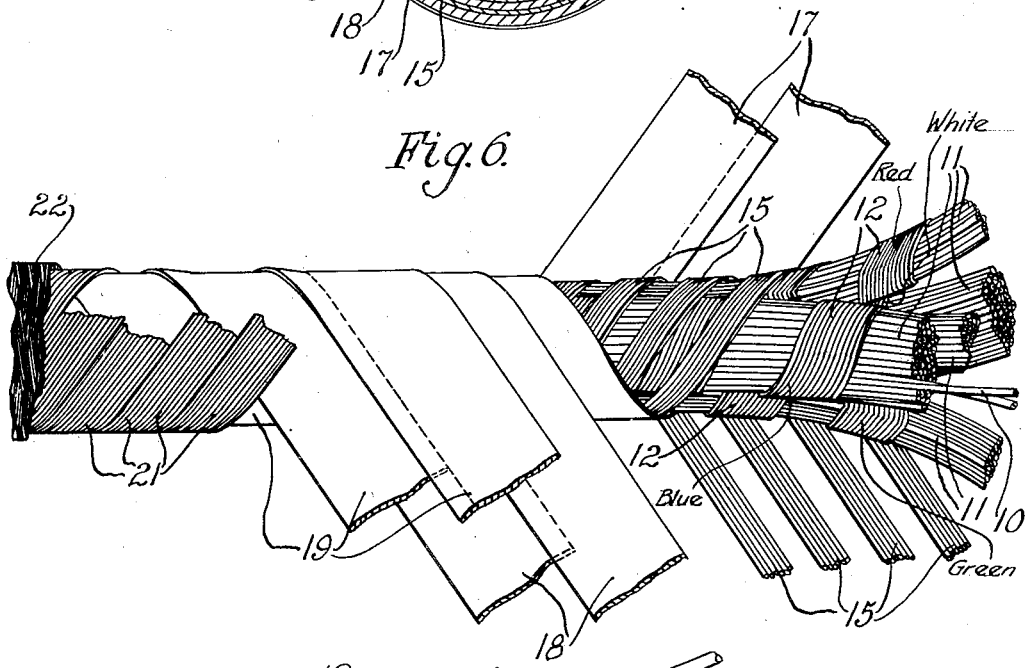
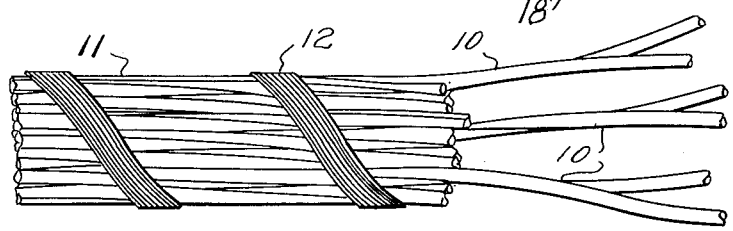
Inventor
John H. Biggar Patented Sept. 10, 1929.

1,727,955

UNITED STATES PATENT OFFICE.

JOHN HOWARD BIGGAR, OF OAK PARK, ILLINOIS, ASSIGNOR TO WESTERN ELECTRIC COMPANY, INCORPORATED, OF NEW YORK, N. Y., A CORPORATION OF NEW YORK.

ELECTRICAL CABLE.

Application filed October 22, 1924. Serial No. 745,096.

This invention relates to improvements in electrical cables particularly of the type employed for telephonic communication, together with the method of making such cable.

In interconnecting electrical apparatus cooperating to form independent and similar circuits, such as the apparatus associated with the individual subscribers lines of a telephone exchange it is frequently the practice to employ electrical conductors formed into cables. Each cable of this sort contains under a common protective sheath a sufficient number of conductors which are sometimes arranged in units, such as pairs and triples, to serve a predetermined number of similar circuits. Since the individual pieces of electrical apparatus employed in the telephone exchange are frequently assembled in sets of twenty, such cables in many instances comprise twenty units of conductors each unit extending to an individual piece of apparatus. The sets of similar apparatus are usually placed together and the cables interconnecting the different types of apparatus are also assembled into so-called cable runs.

In order to facilitate the connection of the conductors to the apparatus, as well as to readily identify the apparatus interconnected into the separate and similar circuits, it has been found advantageous to employ some means for distinguishing the units of conductors. One way in which this has been done is to distinctively color the insulation of one conductor, termed the master conductor, of each unit, the other conductors thereof being intertwined therewith. A combination of solid colors and tracer colors is often used in this manner to form a color code, which not only distinguishes the units but also definitely indicates the arbitrarily fixed numerical order of the units within the cable, which order is employed in all cables of a similar nature. Thus in a twenty wire unit cable the identifying conductors of the units numbered 1 to 20 inclusive may be colored as follows: (1) blue, (2) orange, (3) green, (4) brown, (5) slate, (6) blue-white, (7) blue-orange, (8) blue-green, (9) blue-brown, (10) blue-slate, (11) orange-white, (12) orange-brown, (13) orange-green, (14) orange-slate, (15) green-white, (16) green-brown, (17) green-slate, (18) brown-white, (19) brown-slate, and (20) slate-white. This color code has become so well established among certain workmen that the units can be immediately identified as to their numerical relation to the other units in the cable and no testing is required to determine the circuit number with which the unit is associated.

In some instances where the distance between the interconnected apparatus is comparatively short, or where the space for placing the cable is restricted, it is desirable to use a considerably larger cable, for instance one serving 100 circuits. In such a case, due to the increasing number of circuits served, it is more difficult to distinguish the units of conductors by colors or otherwise so as to definitely indicate the number of the unit within the cable. In some cases of these larger cables all units of the conductors have been similarly colored, in which case it is necessary to test each unit electrically to properly connect the conductors to the pieces of apparatus. In other instances the cable has been composed of a plurality of large groups, each group comprising a plurality of units, which then become sub-groups, distinguished by means of a color scheme, such as that above mentioned. However, in this case, although the position of the sub-group within the main group is readily apparent, no indication is given as to the particular group within which the sub-group belongs.

An object of the invention is to provide a cable particularly of the type employed for telephonic communication and signaling, consisting of a plurality of individually insulated conductors arranged in well defined strands or groups, the insulation of some of the conductors in adjacent groups being in actual engagement with each other.

Another object of the invention is to provide a cable made up of a plurality of individual multiple conductor strands distinctive in appearance and held together in close engagement with each other by a common retaining means.

A further object of the invention is to provide a cable consisting of a plurality of insulated conductors arranged in sub-groups, each sub-group being distinctive and indicating its relative position within a main group, the main group also being distinctive and indicating their relative positions in the cable.

In order to attain these objects there is provided in accordance with the features of the invention, in one embodiment thereof, a cable wherein the conductors are assembled into units or sub-groups for serving individually separate circuits, the insulation of one conductor of each of the units bearing a distinguishing color or colors. The units are assembled into well defined groups and retained therein by a textile wrapping served therearound in an open helical formation so that the insulation of some of the conductors of adjacent groups are in engagement with each other. The outer groups are preferably stranded around one centrally disposed group. The colors of the master conductors of the units are arranged in accordance with a predetermined color scheme or code so that each such conductor indicates the relative position of its unit within its group. The color schemes employed within the groups are identical and the retaining textile servings around the strands or groups are distinctively colored, preferably in accordance with the same color code, so that the position of the groups within the cable also may be readily apparent.

It is believed that the invention will be clearly understood from the following description taken in connection with the accompanying drawings illustrating one embodiment of the invention, in which Figs. 1 and 2 are schematic side elevations of parts of the apparatus used in making the improved form of cable;

Fig. 3 is an enlarged vertical sectional view taken on the line 3—3 of Fig. 1 showing the disposition of the strands or groups with respect to each other before their passage through a forming die;

Fig. 4 is an enlarged vertical sectional view taken on the line 4—4 of Fig. 1 showing the die for forming the groups of conductors so that the composite cable presents a substantially cylindrical exterior;

Fig. 5 is a vertical sectional view of a completed cable made in accordance with the invention;

Fig. 6 shows a fragmentary length of a completed cable constructed in accordance with the invention, portions of the textile binders, insulating layers and sheath being broken away to clearly show the construction, and Fig. 7 is an enlarged view of one of the groups of conductors constituting the cable showing that the individual conductors are twisted into pairs and are arranged substantially parallel to each other.

The construction of the improved form of cable, it is believed, will be understood by a description of the method of making one embodiment of the same.

A plurality of copper wires insulated with paper, cotton, silk, or other suitable material which may be twisted together in pairs to form a unit as indicated at 10 in Fig. 6 are stranded together loosely to form a strand, bundle or group 11 which may consist of twenty units 10 of conductors. The twenty units 10 are stranded together in the same direction as wires are twisted to form the pairs comprising the units, preferably in a right hand direction. The conductors of the group 11 are held together in their loosely stranded condition by a suitable strand binder 12 of cotton or other suitable material which is wrapped helically in a right hand direction, the turns of which are spaced widely apart as illustrated in Fig. 1. The insulation of one or master conductor of each unit 10 is distinctively colored in accordance with the predetermined color code as hereinbefore described to facilitate the connection of a particular unit 10 of conductors with the corresponding piece of apparatus of a set, as well as to readily identify the apparatus interconnected into the separate and similar circuits. In order to indicate the particular set of apparatus to which a strand or group of conductors is to be connected, the strand binder 12 is distinctively colored, preferably in accordance with the color code of the master conductors. As hereinbefore described, the color of the master conductor within each unit is arranged in accordance with a predetermined color scheme or code so that each such conductor indicates the relative numerical position of the unit within its group. Thus one group may have a strand binder colored 1 (blue), another 2 (orange), etc., all in accordance with the identifying color code as hereinbefore described in connection with the master conductors of the units.

In the formation of a cable as illustrated in Figs. 5 and 6, a plurality of strands or groups 11 which, as illustrated, may be five in number, are formed in the manner hereinbefore described and then stranded together preferably in a right hand direction to constitute a plurality of multiple conductor strands in the form shown in Figs. 1 and 4. In the stranding of each individual group 11, and also the stranding of the five groups 11 in a single cable, any suitable type of strander may be used, such as that employed in the stranding of rope, the construction and operation of which are well known to those skilled in the art.

Means are provided for thereafter applying to the compressed group means for compressing the groups 11 and for retaining the groups in the latter formation. This means may comprise a cylindrical die 14 (Figs. 1 and 4) through which the stranded cable is drawn, the die serving to compress the groups 11 into a cylindrical composite form which is retained by means of a textile wrapping, indicated at 15, served therearound in an open helical formation in a direction opposite to the twist given the conductors of the units 10, the units 10 in forming groups 11 and the groups 11 in forming the cable. The textile wrapping 15 may be applied by a usual form of tape serving head 16 shown schematically in Fig. 1. The die 14 and head 16 may, for economy, be mounted on the machine (not shown) which strands the groups 11 together.

After the cable groups 11 have been passed through the apparatus shown in Figs. 1 and 4, the loosely stranded groups 11 assume the shapes shown in Figs. 4 and 5, in which the central cable group 11 is compressed into what might be termed roughly a rectangle with convex sides, while the four groups 11 arranged therearound are given a shape which may be defined as a "sector shape" for want of a better descriptive term.

The strands or grouping of the groups 11 into the cylindrical composite form, as illustrated in Figs. 4 and 5, is due to the fact that each group 11 is relatively soft caused by its being formed loosely in the stranding operation, and also that the strand binder 12 of each group 11 is wrapped in an open spiral having a long lay which combined with the loose stranding of the groups allows the groups 11 to assume the form illustrated without a great deal of pressure being exerted by the die 14.

By referring to Figs. 4 and 5, it will be apparent that each strand or group 11 is in effect, a separate small cable, and due to the color scheme of the strand binder 12 employed for binding the conductors of the strands or groups, they are clearly defined and readily distinguishable from each other. Furthermore, although the groups are readily distinguishable, they are in close association, the insulation of the outer conductors of each strand or group exposed between the helical turns of the strand binder being in actual engagement with the insulation of the conductors of adjacent groups.

Applied to the outside of the textile wrapping 15 (Fig. 2) in a closed helical formation is a serving of paper tape 17, thereafter a serving of lead tape 18 and another serving of paper tape 19 are applied over the paper tape 17 in a closed helical formation. The paper tape servings 17 and 19 and the serving of lead tape 18 are all applied in a right hand direction by a taping machine shown schematically in Fig. 2, which may be of any suitable tape. Also applied by the taping machine over the paper tape serving 19 in a closed helical formation and in an opposite (left hand) direction thereto is a textile wrapping 21. The cable is then provided with a textile braided sheath indicated at 22 (Fig. 6), the braiding machine for braiding this sheath may be of any usual well known type and thereafter the cable sheath may be given a coating of protective paint indicated at 23 (Fig. 5) by passing it through a cable paint-ing machine of the type disclosed in copending application of F. S. Kochendorfer and H. J. Boe, Serial No. 520,712, filed December 7, 1921, which resulted in Patent No. 1,526,071, issued February 10, 1925.

What is claimed is:

1. In a cable for the transmission of intelligence electrically, a core comprising a plurality of pairs of similarly, individually insulated pairs of conductors, a plurality of conductors held together in groups solely by a distinguishable retaining means of insulating material, said groups being arranged around the core, the insulation of the conductors of each group being in actual engagement with the insulation of adjacent groups, and the pairs of conductors in a group being substantially parallel to the other pairs of conductors in that group.

2. The method of making a cable for the transmission of intelligence electrically, consisting in loosely binding together groups of twisted, individually insulated conductors to form a plurality of multiple conductor strands, said groups being distinguishable from each other, assembling the strands to form a composite cable, and then subjecting the said cable to pressure sufficient to give it a substantially circular cross section.

3. The method of making a cable for the transmission of intelligence electrically, consisting in loosely binding together groups of twisted, individually insulated conductors to form a plurality of multiple conductor strands of substantially circular cross section distinguishable from each other, assembling the said strands to form a core located at the center with the other of said strands grouped around the core to form a composite cable, and then subjecting the composite cable to pressure sufficient to give the strands surrounding the core a sector shape.

4. The method of making a cable for the transmission of intelligence electrically, consisting in loosely binding together groups of pairs of individually insulated conductors to form a plurality of multiple conductor strands, said pairs being substantially parallel to each other and the groups being distinguishable from each other, assembling the strands to constitute a composite cable, and then subjecting said cable to pressure sufficient to compress said groups.

5. In a cable for the transmission of intelligence electrically, individually insulated pairs of conductors, said pairs of conductors held together loosely in well defined groups by a binding material, the conductors of each group having the pairs of same distinctive appearance as the conductors of adjacent groups, and the binding material of each group having a distinctive appearance from the binding material of adjacent groups in order to distinguish the groups one from the other.

6. In a cable for the transmission of intelligence electrically, individually insulated conductors twisted in pairs, said pairs of conductors held together in well defined groups by a binding material, the conductors of each group having the same distinctive appearance as the conductors of adjacent groups, the binding material associated with each group having a distinctive appearance from the binding material associated with adjacent groups to distinguish the groups from each other, the insulation of the conductors of each group being in actual contact with the insulation of the conductors of adjacent groups.

7. A method of making a cable for the transmission of intelligence electrically, consisting in loosely binding together individually insulated conductors by a distinguishable retaining means to form a plurality of multiple conductor strands, assembling the strands to form a composite cable, the retaining means associated with each strand having a distinctive appearance from the retaining means associated with adjacent strands, and then subjecting the cable to pressure sufficient to give it a substantially circular cross section.

8. A method of making a cable for the transmission of intelligence electrically, consisting in twisting individually insulated conductors into pairs, loosely binding the pairs into groups to form a plurality of multiple conductor strands, and then assembling the strands to constitute a composite cable, the binding means employed being of such a color as to distinguish each multiple conductor strand from its adjacent strand.

9. A method of making a cable for the transmission of intelligence electrically, consisting in twisting individual insulated conductors into pairs, loosely binding together pairs to form a plurality of multiple conductor strands substantially circular in cross section, assembling the strands to constitute a composite cable, the binding means associated with each strand having a different appearance from the binding means associated with adjacent strands, and then subjecting the said cable to pressure sufficient to give it a substantially circular cross section.

In witness whereof, I hereunto subscribe my name this 17th day of October A. D., 1924.

JOHN HOWARD BIGGAR.